(12) United States Patent
Suggs et al.

(10) Patent No.: US 8,782,384 B2
(45) Date of Patent: Jul. 15, 2014

(54) BRANCH HISTORY WITH POLYMORPHIC INDIRECT BRANCH INFORMATION

(75) Inventors: David Suggs, Austin, TX (US); Ravindra N. Bhargava, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1347 days.

(21) Appl. No.: 11/961,511

(22) Filed: Dec. 20, 2007

(65) Prior Publication Data
US 2009/0164766 A1 Jun. 25, 2009

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC .......................................................... 712/240

(58) Field of Classification Search
USPC .......................................................... 712/240
See application file for complete search history.

(56) References Cited

U.S. PATENT DOCUMENTS

| | | |
|---|---|---|
| 5,163,140 A | 11/1992 | Stiles et al. |
| 5,276,882 A | 1/1994 | Emma et al. |
| 5,423,011 A | 6/1995 | Blaner et al. |
| 5,515,518 A | 5/1996 | Stiles et al. |
| 6,067,616 A | 5/2000 | Stiles et al. |
| 6,141,748 A | 10/2000 | Tran |
| 6,502,188 B1 | 12/2002 | Zuraski et al. |
| 6,553,488 B2 | 4/2003 | Yeh et al. |
| 7,024,545 B1 | 4/2006 | Zuraski et al. |
| 2008/0256347 A1* | 10/2008 | Eickemeyer et al. .......... 712/240 |
| 2008/0276081 A1* | 11/2008 | Nair .............................. 712/240 |

FOREIGN PATENT DOCUMENTS

EP 798632 10/1997

OTHER PUBLICATIONS

Chang; Target Prediction for Indirect Jumps; ISCA '97; ACM.*
International Search Report, Application No. PCT/US02/20481, International Filing Date Jun. 27, 2002.

* cited by examiner

*Primary Examiner* — Corey S Faherty
(74) *Attorney, Agent, or Firm* — Rory D. Rankin; Meyertons, Hood, Kivlin & Goetzel, P.C.

(57) ABSTRACT

A system and method for efficient improvement of branch prediction in a microprocessor with negligible impact on die-area, power consumption, and clock cycle period. It is determined if a program counter (PC) register contains a polymorphic indirect unconditional branch (PIUB) instruction. One determination may be searching a table with a portion or all of a PC of past PIUB instructions. If a hit occurs in this table, the global shift register (GSR) is updated by shifting a portion of the branch target address into the GSR, rather than updating the GSR with a taken/not-taken prediction bit. The stored value in the GSR is input into a hashing function along with the PC in order to index prediction tables such as a pattern history table (PHT), a branch target buffer (BTB), an indirect target array, or other. The updated value due to the PIUB instruction improves the accuracy of the prediction tables.

15 Claims, 3 Drawing Sheets

BRANCH HISTORY WITH POLYMORPHIC INDIRECT BRANCH INFORMATION

BACKGROUND OF THE INVENTION

1. Field of the Invention

This invention relates to microprocessors, and more particularly, to branch prediction mechanisms.

2. Description of the Relevant Art

Modern microprocessors may include one or more processor cores, or processors, wherein each processor is capable of executing instructions of a software application. These processors are typically pipelined, wherein the processors include one or more data processing stages connected in series with storage elements placed between the stages. The output of one stage is made the input of the next stage during each transition of a clock signal. Some processors may have multiple pipelines. Ideally, every clock cycle produces useful execution of an instruction for each stage of a pipeline. However, a stall in a pipeline may cause no useful work to be performed during that particular pipeline stage. Some stalls may last several clock cycles and significantly decrease processor performance. Some examples of a stall include a data-cache or instruction-cache miss, data dependency between instructions, and control flow misprediction, such as a mispredicted branch instruction.

The negative effect of stalls on processor performance may be reduced by overlapping pipeline stages. A further technique is to allow out-of-order execution of instructions, which helps reduce data dependent stalls. However, a stall of several clock cycles still reduces the performance of the processor due to in-order retirement that may prevent hiding of all the stall cycles. Therefore, another method to reduce performance loss is to reduce the occurrence of the multi-cycle stalls. One such multi-cycle stall is a misprediction of a control flow instruction, such as a branch instruction.

Control flow instructions comprise many types such as conditional or unconditional, direct or indirect, and mono-morphic, duomorphic, or polymorphic. A conditional control flow instruction performs a determination of which path to take in an instruction stream. If the control flow instruction determines a condition is not satisfied, then the control flow instruction is considered to be not-taken and the next sequential instruction in program order is executed. However, if the control flow instruction determines a condition is satisfied, then the control flow instruction is considered to be taken, and an instruction which is not the next sequential instruction in program order, but rather is located at the branch target address, is executed. An unconditional control flow instruction is considered an always taken conditional control flow instruction. There is no condition to test, and execution of instructions always occurs in a different sequence than sequential order.

In addition, a branch target address may be specified by an offset, which may be stored in the control flow instruction itself, relative to the program counter (PC) register value. This type of branch target address is referred to as direct. A branch target address may also be specified by a value in a register or memory, wherein the register or memory location may be stored in the control flow instruction. This type of branch target address is referred to as indirect. Further, in an indirect control flow instruction, the register specifying the branch target address may be loaded with different values. If the register specifying the branch target address only stores one value for the corresponding indirect control flow instruction, then the indirect control flow instruction is referred to as monomorphic. If this register may store 2 values for the corresponding indirect control flow instruction, then the indirect control flow instruction is referred to as duomorphic. And if this register may store more than 2 values for the corresponding indirect control flow instruction, then the indirect control flow instruction may be referred to as polymorphic.

Examples of unconditional indirect control flow instructions include procedure calls and returns that may be used for implementing subroutines in program code, and that may use a Return Address Stack (RAS) to supply the branch target address. Another example is a jump instruction that may be used for case and switch statements in program code. An example of a conditional control flow instruction is a branch instruction that may be used to implement loops in program code.

Conditional branch instructions must satisfy a condition to be considered taken. An example of a satisfied condition may be a specified register now holds a stored value of zero. The specified register is encoded in the conditional branch instruction. This specified register may have its stored value decrementing in a loop due to instructions within software application code. The output of the specified register may be input to dedicated zero detect combinatorial logic. An example of a loop in code may be as follows:

```
         LW     R5, 0(R3)
loop:    ADD    R8, R8, R2
         SUB    R5, R5, R6
         BNEZ   R5, loop
         LW     R7, 0(R4)
```

The above loop may be implementing a FOR loop construct in code where the register R5 holds an index value. The register R5 has its value decremented by a value stored in register R6 during each iteration of the loop. The branch instruction, BNEZ, determines if the value stored in register R5 is not equal to zero. If the condition is taken, or R5 holds a non-zero value, the instruction sequence continues with the instruction at the branch target address designated by "loop" in the branch instruction. Here, the branch target address is a PC-relative address. An immediate field, such as "loop" above, that holds a displacement value may be encoded in the direct branch instruction. The above branch instruction is a conditional direct control flow instruction.

In the taken case, rather than continue a sequential order of the instructions within the application, the taken conditional branch instruction causes execution to occur in a different sequence, such as with the ADD instruction designated with the "loop" label.

If the condition is not satisfied, such as register R5 above now does hold a zero value, then the conditional direct branch instruction is considered not-taken. In this case, the instructions within the application continue execution in sequential order. In this case the load word instruction, LW, will load a value into register R7.

Conditional branch instructions may have some dependency on one another. For example, a program may have a simple case such as:

```
if (value == 0) value == 1;
if (value == 1)
```

The conditional branch instructions that will be used to implement the above case will have global history that may be used to improve the accuracy of predicting the conditions. The prediction may be implemented by 2-bit counters and is described in more detail later.

An indirect jump instruction may be used to implement a switch-case statement, which is popular in object-oriented programs such as C++ and Java. An example of a switch-case statement is as follows:

```
switch (menu) {              // indirect jump
    case 1:                  // branch target address 1
        // 12 instructions
        break;
    case 2:                  // branch target address 2
        // 8 instructions
        break;
    case 3:                  // branch target address 3
        // 4 instructions
        break;
    case default:            // branch target address 4
        break;
}
if (somevalue == 2) {        // merge point of indirect jump
```

In the above example, the indirect jump instruction has 4 static branch target addresses, which may not be taken in an evenly distributed manner (i.e. each branch target address may not be taken 25% of the time). The above indirect jump may be referred to as a polymorphic indirect unconditional branch instruction. In the above example, the indirect jump only has 4 branch target addresses, but the number of branch target addresses may reach as high as a few dozen.

Modern microprocessors may need multiple clock cycles to both determine the outcome of the condition of a branch instruction and to determine the branch target address. For a particular thread being executed in a particular pipeline, no useful work may be performed by the branch instruction or subsequent instructions until the branch instruction is decoded and later both the condition outcome is known and the branch target address is known. These stall cycles decrease the processor's performance.

Rather than stall, predictions may be made of the conditional branch condition and the branch target address shortly after the instruction is fetched. The exact stage as to when the prediction is ready is dependent on the pipeline implementation. In order to predict a branch condition, the PC used to fetch the instruction from memory, such as an instruction cache (i-cache), may be used to index branch prediction logic. One example of a combined prediction scheme that uses the PC is the gselect branch prediction method described in Scott McFarling's 1993 paper, "Combining Branch Predictors", Digital Western Research Laboratory Technical Note TN-36, incorporated herein by reference in its entirety.

High branch prediction accuracy contributes to more power-efficient and higher performance microprocessors. Polymorphic indirect unconditional branch (PIUB) instructions are occurring more frequently in application programs due to an increase in object-oriented programs that commonly use this type of instruction. An indirect target buffer is commonly used to make predictions for duomorphic and polymorphic indirect branch instructions, including PIUB instructions. The overhead for an indirect target buffer, similar to a branch target buffer (BTB) used to make predictions for monomorphic branch instructions, is higher than predictors for conditional branches. This greater overhead for an indirect target buffer entry or a BTB entry is generally due to the fact that the entry stores a full 32-bit or 64-bit branch target address compared to, for example, a 2-bit counter and a taken or not-taken bit for a conditional branch predictor. Also the prediction rates for PIUB instructions are lower than prediction rates for conditional branches. Further, although PIUB instructions contribute to the dynamic code path, their outcomes are not used in branch prediction mechanisms.

In view of the above, efficient methods and mechanisms for using PIUB instructions to improve control flow prediction is desired.

SUMMARY OF THE INVENTION

Systems and methods for branch prediction in a microprocessor are contemplated.

In one embodiment, a control flow prediction unit within a microprocessor may comprise a polymorphic indirect unconditional branch (PIUB) table that stores in each of its entries an identifier (e.g., a PC) of a PIUB instruction. The PIUB table may be indexed by a current PC. In the case of a hit, a global history shift register (GSR) is updated by bits of the branch target address of the PIUB instruction, rather than a predicted taken/not-taken bit. In one embodiment, the update may comprise shifting a portion of the corresponding branch target address into the GSR, such as 4 bits. This portion of the branch target address may be located in the middle of the branch target address away from the infrequently changing high-order bits and the frequently changing low-order bits. In one embodiment, the portion may be chosen to be 4 bits of the branch target address, such as bits 7 to 4, and may be shifted into the GSR, which in one embodiment may be implemented as a one-entry 10-bit shift register. In other embodiments a different selection of bits of the branch target address may be chosen. Also, in other embodiments, the GSR may be implemented by a multiple-entry shift register, wherein an entry is chosen by an index, and each entry may comprise a shift register of one or more bits. In an alternative embodiment, a portion of the branch target address, such as 3 bits of the branch target address bits, such as bits 7 to 5, may be combined with selected bits of the GSR, such as the 3 most-recent bits of the GSR, in an exclusive OR operation. Then the 3 most-recent bits of the GSR may be updated with the outcome. In one embodiment, values stored in the PC and the GSR are input to a hashing function which is used to correlate the current branch instruction with a global history. Both the output of the hashing function and the PC may be used to index prediction tables such as a pattern history table (PHT), a branch target buffer (BTB), or otherwise. The update of the GSR with branch target address information of a current PIUB instruction, rather than a taken-not-taken prediction, may increase the prediction accuracy of both conditional branch direction predictions (i.e. taken and not-taken outcome predictions) and indirect branch target address predictions, such as a BTB prediction or an indirect target array prediction.

In another aspect of the invention, a method is provided to determine if a current instruction is a PIUB instruction based on the corresponding PC. If an instruction is detected to be a PIUB instruction, a GSR, which in one embodiment may be implemented as a 10-bit shift register, is updated by bits of the branch target address, rather than a predicted taken/not-taken bit. In one embodiment, the update may comprise shifting a portion of the corresponding branch target address, such as bits 7 to 4 of the branch target address, into the GSR. This portion of the branch target address may be located away from the infrequently changing high-order bits and the frequently changing low-order bits. In an alternative embodiment, a portion, such as bits 7 to 5 of the branch target address, may be combined with the 3 most-recent bits of the GSR in an exclusive OR operation. Then the 3 most-recent bits of the GSR may be updated with the outcome. A hashing function may be used to correlate the current branch instruction with a global history. Both the output of the hashing function and the PC may be used to index prediction tables such as a pattern history table (PHT), a branch target buffer (BTB), or other.

In still another aspect of the invention, a microprocessor is provided comprising a control flow prediction unit coupled to an instruction fetch unit. A current PC value within the microprocessor may be determined to correspond to a PIUB instruction, such as performing a hit in a PIUB table. The PIUB table may hold the PC of past PIUB instructions. When such a determination is made, the GSR within the control flow prediction unit may be updated by shifting a portion of the corresponding branch target address, such as bits 7 to 4 of the branch target address,] into the GSR. This portion of the branch target address may be located away from the infrequently changing high-order bits and the frequently changing low-order bits. In an alternative embodiment, a portion, such as bits 7 to 5 of the branch target address, may be combined with the 3 most-recent bits of the GSR in an exclusive OR operation. Then the 3 most-recent bits of the GSR may be updated with the outcome. A hashing function may be used to correlate the current branch instruction with global history. Both the output of the hashing function and the PC may be used to index prediction tables such as a pattern history table (PHT), a branch target buffer (BTB), or other. The new update mechanism within the control flow prediction unit may improve the accuracy of branch prediction.

Figure 1:
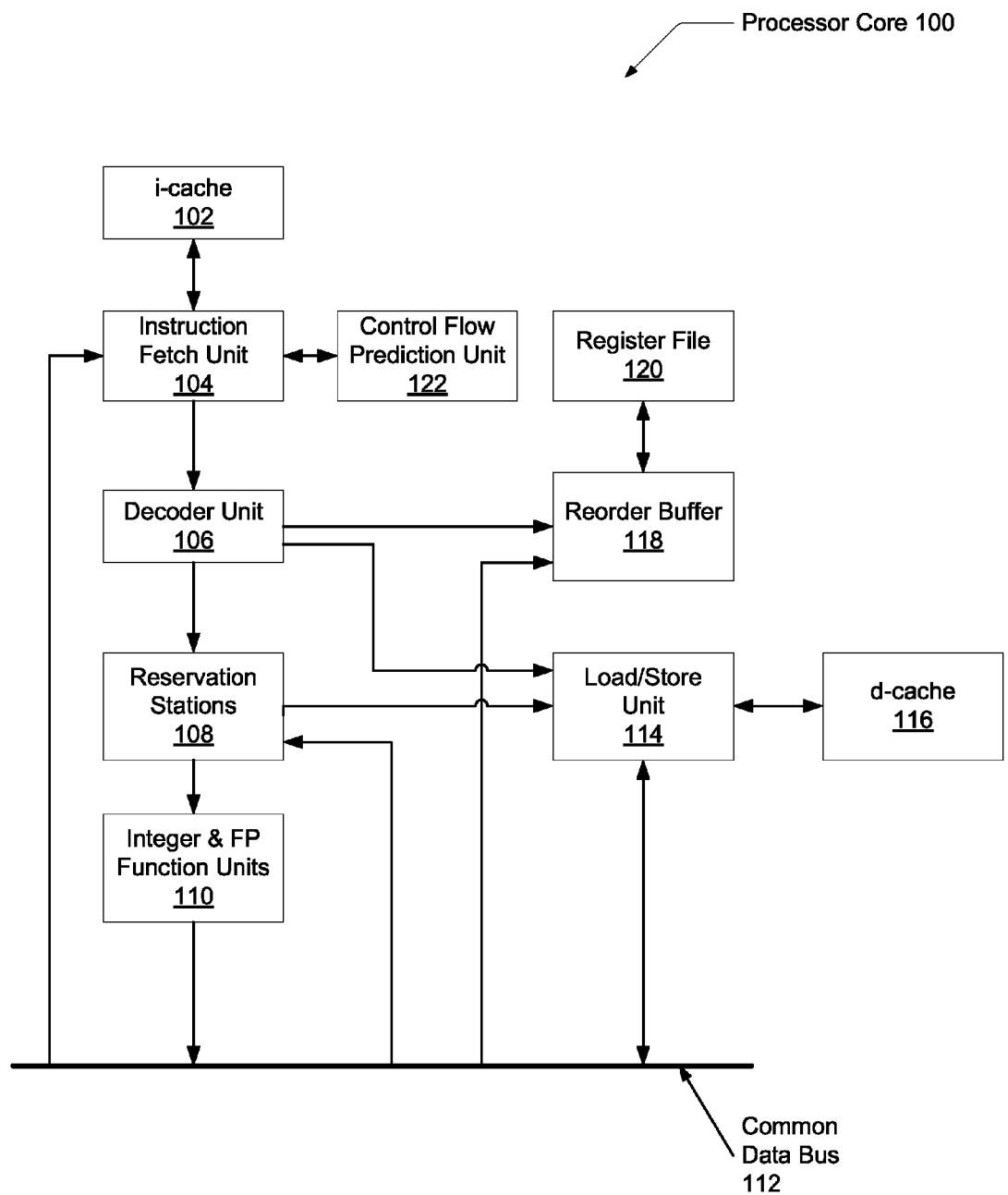
FIG. 1 is a generalized block diagram illustrating one embodiment of a processor core capable of out-of-order execution.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a processor core 100 that performs out-of-order execution is shown. An instruction-cache (i-cache) 102 may store instructions for a software application. The instruction fetch unit (IFU) 104 may fetch multiple instructions from the i-cache 102 per clock cycle if there are no i-cache misses. The IFU 104 may include a program counter (PC) register that holds a pointer to an address of the next instructions to fetch from the i-cache 102. A control flow prediction unit 122 may be coupled to the IFU 104. Unit 122 may be configured to predict information of instructions that change the flow of an instruction stream from executing a next sequential instruction. An example of prediction information may include a 1-bit value comprising a prediction of whether or not a condition is satisfied that determines if a next sequential instruction should be executed or an instruction in another location in the instruction stream should be executed next. Another example of prediction information may be an address of a next instruction to execute that differs from the next sequential instruction. The determination of the actual outcome and whether or not the prediction was correct may occur in a later pipeline stage. Also, in an alternative embodiment, IFU 104 may comprise unit 122, rather than have the two be implemented as two separate units.

The decoder unit 106 decodes the opcodes of the multiple fetched instructions and may allocate entries in an in-order retirement queue, such as reorder buffer 118, in reservation stations 108, and in a load/store unit 114. The allocation of entries in the reservation stations 108 is considered dispatch. The reservation stations 108 may act as an instruction queue where instructions wait until their operands become available. When operands are available and hardware resources are also available, an instruction may be issued out-of-order from the reservation stations 108 to the integer and floating point functional units 110 or the load/store unit 114. The functional units 110 may include arithmetic logic units (ALU's) for computational calculations such as addition, subtraction, multiplication, division, and square root. Logic may be included to determine an outcome of a control flow instruction and to compare the calculated outcome with the predicted value. If there is not a match, a misprediction occurred, and the subsequent instructions after the control flow instruction need to be removed and a new fetch with the correct PC value needs to be performed.

The load/store unit 114 may include queues and logic to execute a memory access instruction. Also, verification logic may reside in the load/store unit 114 to ensure a load instruction received forwarded data, or bypass data, from the correct youngest store instruction.

Results from the functional units 110 and the load/store unit 114 may be presented on a common data bus 112. The results may be sent to the reorder buffer 118. Here, an instruction that receives its results, is marked for retirement, and is head-of-the-queue may have its results sent to the register file 120. The register file 120 may hold the architectural state of the general-purpose registers of processor core 100. In one embodiment, register file 120 may contain 32 32-bit registers. Then the instruction in the reorder buffer may be retired in-order and its head-of-queue pointer may be adjusted to the subsequent instruction in program order.

The results on the common data bus 112 may be sent to the reservation stations in order to forward values to operands of instructions waiting for the results. When these waiting instructions have values for their operands and hardware resources are available to execute the instructions, they may be issued out-of-order from the reservation stations 108 to the appropriate resources in the functional units 110 or the load/store unit 114. Results on the common data bus 112 may be routed to the IFU 104 and unit 122 in order to update control flow prediction information and/or the PC value.

Figure 2:
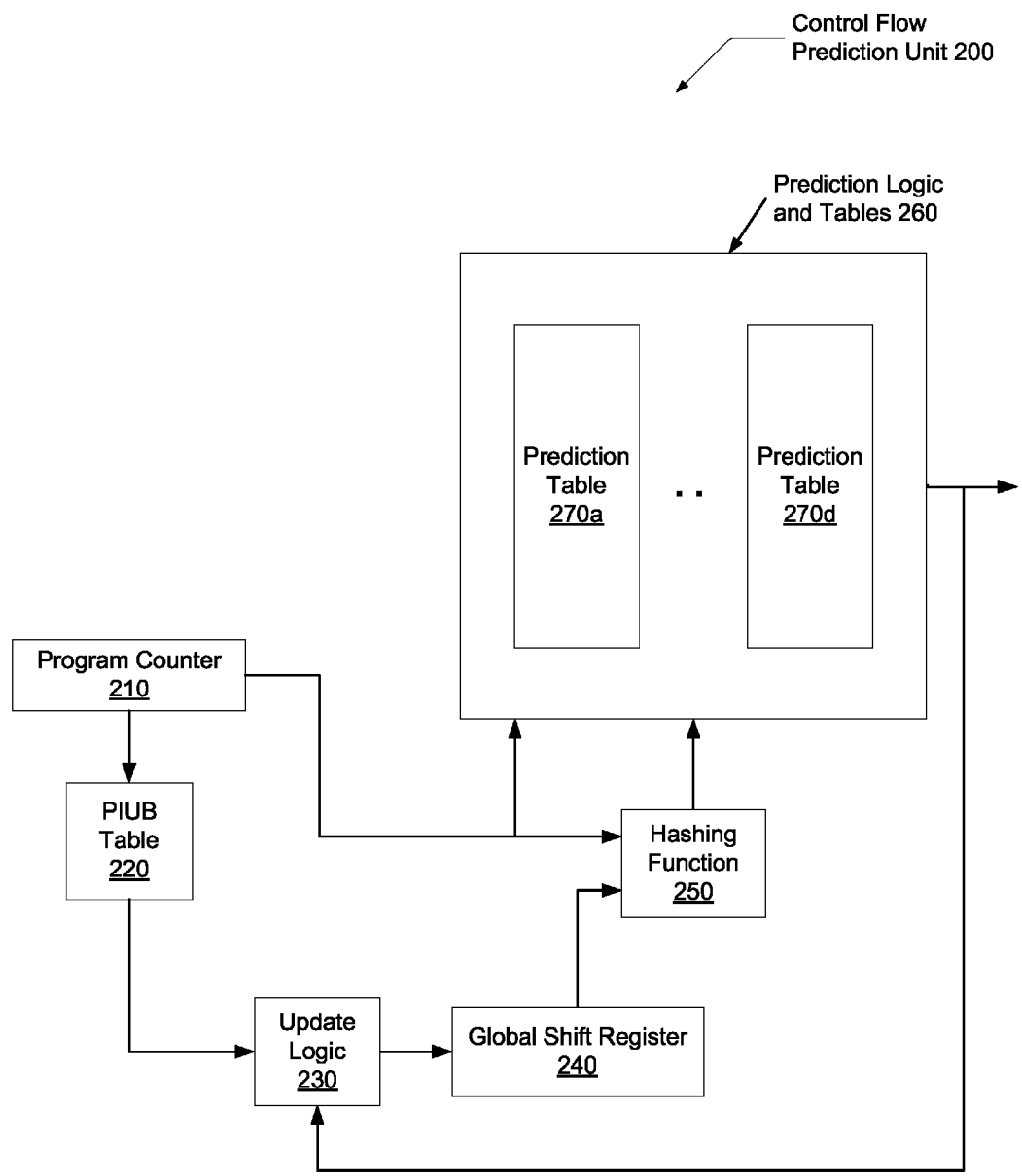
FIG. 2 is a generalized block diagram illustrating one embodiment of a control flow prediction unit.

FIG. 2 illustrates one embodiment of a control flow prediction unit 200. The address of an instruction is stored in the register program counter 210 (PC 210). In one embodiment, the address may be a 32-bit or a 64-bit value. A global history shift register 240 (GSR 240) may contain a recent history of the prediction results of a last number of conditional branch instructions. In one embodiment, GSR 240 may be a one-entry 10-bit shift register. Other embodiments of the shift register GSR 240 may include a different number of bits. The information stored in GSR 240 may be used to predict whether or not a condition is satisfied of a current conditional branch instruction by using global history. For example, in one embodiment, GSR 240 may be a 10-bit shift register that holds the 1-bit taken/not-taken results of the last 10 conditional branch instructions in program execution. In one embodiment, a logic "1" may indicate a taken outcome and a logic "0" may indicate a not-taken outcome, or vice-versa. Further, in alternative embodiments, GSR 240 may use information corresponding to a per-branch basis or to a combined-branch history within a table of branch histories. One or more branch history tables (BHTs) may be used in these embodiments to provide global history information to be used to make branch predictions.

If enough address bits (i.e. the PC of the current branch instruction stored in PC 210) are used to identify the current branch instruction, a hashing of these bits with the global history stored in GSR 240 may have more useful prediction information than either component alone. In one embodiment, the low-order 10 bits of the PC may be hashed with the 10 bits of the GSR. In alternate embodiments, bits other than the low-order 10 bits of the PC, and possibly non-consecutive bits, may be hashed with the bits of the GSR. Numerous such alternatives are possible and are contemplated. In one embodiment, the hashing of the PC bits and the GSR bits may comprise concatenation of the bits. In an alternative embodiment, the result of a hashing function may include an exclusive OR of the PC bits with the GSR bits. Other hashing functions performed in hashing function 250 may be used to determine an index to one or more pattern history tables (PHTs) and/or other tables included in prediction logic 260. In one embodiment, the PC alone may be used to index BTBs in prediction logic 260. As used herein, elements referred to by a reference numeral followed by a letter may be collectively referred to by the numeral alone. For example, prediction tables 270a-270d may be collectively referred to as prediction tables 270.

In one embodiment, one prediction table 270 may be a PHT for conditional branches, wherein each entry of the PHT may hold a 2-bit counter. A particular 2-bit counter may be incremented and decremented based on past behavior of the conditional branch instruction result (i.e. taken or not-taken). Once a predetermined threshold value is reached, the stored prediction may flip between a 1-bit prediction value of taken and not-taken. In a 2-bit counter scenario, each entry of the PHT may hold one of the following four states in which each state corresponds to 1-bit taken/not-taken prediction value: predict strongly not-taken, predict not-taken, predict strongly taken, and predict taken.

Once a taken/not-taken prediction is determined, its value may be shifted into the GSR 240 speculatively. In the event of a misprediction determined in a later pipeline stage, this value may be repaired with the correct outcome. However, this process also incorporates terminating the instructions fetched due to the branch misprediction that are currently in flight in the pipeline and re-fetching instructions from the correct PC. These steps include pipeline stalls that hinder processor performance.

In one embodiment, the 1-bit taken/not-taken prediction from the PHT may be used to determine the next PC to use to index an i-cache, and simultaneously to update the GSR 240. For example, in one embodiment, if the prediction is taken, the branch target address may be used to determine the next PC. If the prediction is not-taken, the next sequential PC may be used to determine the next PC. In one embodiment, update logic 230 may determine the manner in which GSR 240 is updated. For example, in the case of conditional branches requiring a global history update, update logic 230 may determine to shift the 1-bit taken/not-taken prediction bit into the most-recent position of GSR 240. In some embodiments, a branch may not provide a value for the GSR. Whether or not a given branch, or type of branch, provides a value for the GSR is a design choice.

Instead of updating GSR 240 as described above, an alternate embodiment may be used which includes correlating information of a particular type of branch instruction, such as a PIUB instruction. The update logic 230 may be configured to derive a value for storage in the GSR based on one or more bits of the branch target address of the PIUB instruction. For example, PIUB table 220 indexed by PC 210 may store all or a portion of a PC of a PIUB instruction that occurred earlier in the execution of the code. In an alternative embodiment, the PIUB table 220 may be included in the prediction logic 260, rather than located outside. If a hit occurs in the PIUB table 220, the current instruction may be determined to be a PIUB instruction. The occurrence of a PIUB instruction may be helpful in correlating more information to be used to index prediction tables 270 and therefore, increase the prediction rate of the current branch prediction mechanisms.

For example, in the case of a hit in the PIUB table, in one embodiment, rather than update the GSR 240 with a 1-bit prediction value, update logic 230 may shift 4 bits of the branch target address of the PIUB instruction into GSR 240. An identifier indicating the register, memory location, queue, or other, holding the branch target address may be encoded in the PIUB instruction. In one embodiment, the location may be a register within the set of general purpose registers. These 4 bits of the branch target address may be chosen from a mid-section of the branch target address. The high-order bits of the branch target address will not change often among instructions placed in a similar location in memory, and the low-order bits change frequently due to accesses to different lines, words, and bytes within memory. For example, in one embodiment, bits 7 to 4 of the branch target address may be used. In an alternative embodiment, update logic 230 may not perform a shift operation into GSR 240, but rather perform an exclusive OR of one or more bits of the branch target address and one or more selected bits of GSR 240. Then the selected bits of GSR 240 are replaced with the outcome of the exclusive OR. For example, the outcome of an exclusive OR of 3 bits of the branch target address, such as bits 7 to 5 of the branch target address, and the most-recent 3 bits of GSR 240, may replace the most-recent 3 bits of GSR 240. Other embodiments of update logic 230 may be implemented. In each case, a portion of the branch target address of a PIUB instruction is used to update the global history in an effort to correlate the occurrence of PIUB instructions with current branch prediction mechanisms.

In each implementation of update logic 230, the new global history stored in GSR 240 may increase the accuracy of both conditional branch direction predictions (i.e. taken and not-taken outcome predictions) and indirect branch target address predictions, such as a BTB prediction or an indirect target array prediction. The accuracy improvements may be reached with negligible impact on die-area, power consumption, and clock cycle increase.

Figure 3:
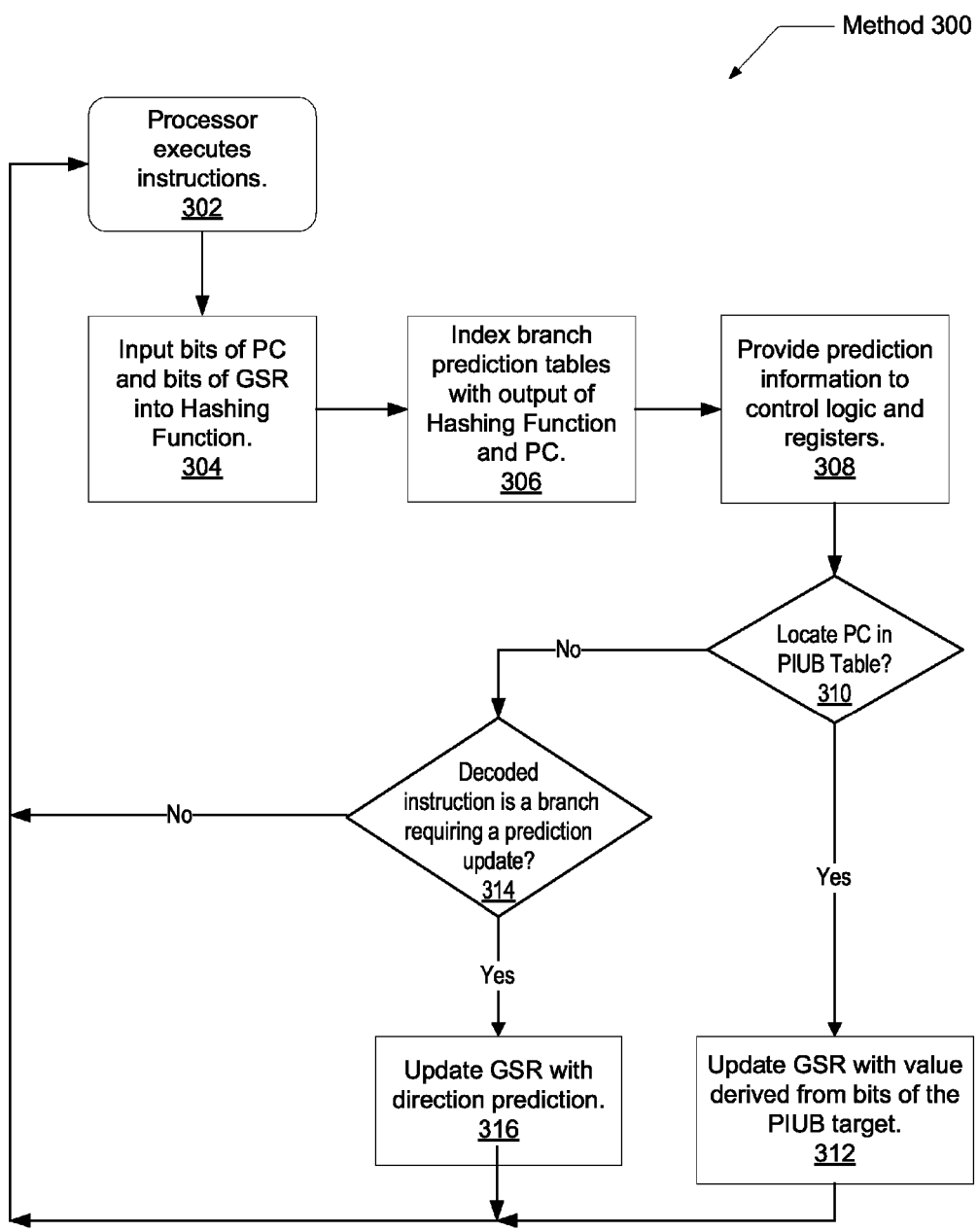
FIG. 3 is a flow diagram of one embodiment of a method for efficient improvement of branch prediction.

FIG. 3 illustrates a method 300 for efficient improvement of branch prediction. Method 300 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a processor executes instructions in block 302. One or more bits of the PC and one or more bits of the global history stored in a GSR are input into a hashing function in block 304. The hashing function may include one of several embodiments such as simply concatenating the bits, performing an exclusive OR of the bits, or other.

In block 306, the output of the hashing function and the PC are used to index branch prediction tables such as a PHT, a BTB, or other. For example, in one embodiment, a PHT and an indirect target array holding indirect branch target addresses may be indexed by the output of the hashing function. The BTB may be indexed by just the PC. If there is a hit in the indexed prediction tables, a prediction value is provided in block 308, such as a taken/not-taken bit from a PHT for conditional branches or a branch target address from a BTB or an indirect target array. If a portion or all of the PC is used to index a PIUB tale and there is a hit (decision block 310), then the PC corresponds to a PIUB instruction and the GSR may be updated with a value derived from one or more bits of the PIUB branch target address in block 312. As stated above, block 310 may occur in parallel with one or more of blocks 304-308. In one embodiment, an update may consist of shifting one or more bits of the PIUB branch target address into the GSR. In another embodiment a selected most-recent bits of the GSR may be updated with the outcome of an exclusive OR of the chosen one or more bits of the PIUB branch target address and the selected most-recent bits of the GSR. Other update mechanisms may be performed in alternative embodiments.

If a miss occurs in the PIUB table (decision block 310), the instruction may or may not be a branch instruction (decision block 314). If there is a miss in all of the branch prediction tables (i.e. PHTs, BTBs, indirect target arrays, other), then the current instruction is either not a branch instruction or it is a first occurrence of a branch instruction. If the current instruction is a first occurrence of a branch instruction, a corresponding table will have an entry filled with the value output from the hashing function and a corresponding branch target address, 2-bit counter value, or other. If the PC is determined to correspond to a conditional branch instruction requiring a global history prediction update, the GSR may be updated with the 1-bit taken/not-taken prediction bit output by a PHT in block 316. Otherwise, no update of the GSR is needed if the current instruction is determined to not be a branch instruction requiring a global history prediction update. Flow returns to block 302 where the processor continues to execute instructions.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A control flow prediction unit comprising:
a global history shift register (GSR);
update logic, wherein in response to determining:
a branch instruction has more than two targets, is indirect, and unconditional, the update logic is configured to derive a value for storage in the GSR based on one or more bits of a branch target address of the branch instruction, wherein said value replaces selected bits of the GSR without performing a shift operation; and
the branch instruction is direct, conditional, or has fewer than three targets, said value comprises a taken/not-taken prediction bit to be shifted into the GSR for the branch instruction.

2. The control flow prediction unit as recited in claim 1, further comprising:
a plurality of pattern history tables (PHTs), wherein each entry of the plurality of PHTs comprises prediction information for a corresponding branch instruction, and wherein said PHTs are indexed based on bits of a program counter (PC) and bits of the GSR;
a PIUB table including one or more entries, each entry of the entries being configured to store at least a portion of a PC of a PIUB instruction; and
logic configured to store at least a portion of a PC corresponding to the branch instruction in an entry of the PIUB table, in response to determining the branch instruction is a PIUB instruction.

3. The control flow prediction unit as recited in claim 2, wherein said determining comprises detecting a hit in said PIUB table, and wherein said value comprises an exclusive OR of said one or more bits with selected bits of the GSR.

4. The control flow prediction unit as recited in claim 2, wherein said taken/not-taken prediction bit is received from the PHTs.

5. The control flow prediction unit as recited in claim 2, wherein said PHTs are indexed by a hashing function based on bits of the PC and bits of the GSR.

6. A method for improving branch prediction comprising:
storing a series of bits in a global history shift register (GSR); and
in response to determining:
a branch instruction has more than two targets, is indirect, and unconditional, deriving a value for storage in the GSR based on one or more bits of a branch target address of the branch instruction, wherein said value replaces selected bits of the GSR without performing a shift operation; and
the branch instruction is direct, conditional, or has fewer than three targets, said value comprises a taken/not-taken prediction bit to be shifted into the GSR for the branch instruction.

7. The method as recited in claim 6, further comprising:
maintaining a plurality of pattern history tables (PHTs), wherein each entry of the plurality of PHTs comprises prediction information for a corresponding branch instruction, and wherein said PHTs are indexed based on bits of a program counter (PC) and bits of the GSR;
maintaining a polymorphic indirect unconditional branch (PIUB) table including one or more entries, each entry of the entries being configured to store at least a portion of a PC of a PIUB instruction; and
storing at least a portion of a PC corresponding to a given instruction in an entry of the PIUB table, in response to determining the given instructions is a PIUB instruction.

8. The method as recited in claim 7, wherein said determining comprises detecting a hit in said PIUB table, wherein said value comprises an exclusive OR of said one or more bits with selected bits of the GSR.

9. The method as recited in claim 7, wherein said taken/not-taken prediction bit is received from the PHTs.

10. The method as recited in claim 7, further comprising indexing said PHTs by a hashing function based on bits of the PC and bits of the GSR.

11. A microprocessor comprising:
an instruction fetch unit configured to receive from an instruction cache one or more instructions corresponding to an address; and
a control flow prediction unit coupled to the instruction fetch unit;
wherein the control flow prediction unit is configured to:

store a series of bits in a global shift register (GSR); and
in response to determining:
- a branch instruction has more than two targets, is indirect, and unconditional, deriving a value for storage in the GSR based on one or more bits of a branch target address of the branch instruction, wherein said value replaces selected bits of the GSR without performing a shift operation; and
- the branch instruction is direct, conditional, or has fewer than three targets, said value comprises a taken/not-taken prediction bit to be shifted into the GSR for the branch instruction.

12. The microprocessor as recited in claim 11, wherein said value comprises an exclusive OR of said one or more bits with selected bits of the GSR, and wherein the control flow prediction unit is further configured to:
- maintain a plurality of pattern history tables (PHTs), wherein each entry of the plurality of PHTs comprises prediction information for a corresponding branch instruction, and wherein said PHTs are indexed based on bits of a program counter (PC) and bits of the GSR;
- maintain a polymorphic indirect unconditional branch (PIUB) table including one or more entries, each entry of the entries being configured to store at least a portion of a PC of a PIUB instruction; and
- store at least a portion of a PC corresponding to a given instruction in an entry of the PIUB table, in response to determining the given instructions is a PIUB instruction.

13. The control flow prediction unit as recited in claim 1, wherein in response to determining the branch instruction corresponds to an indirect, unconditional branch instruction with two targets, the update logic is configured to shift a taken/not-taken prediction bit into the GSR for the branch instruction.

14. The method as recited in claim 6, further comprising shifting a taken/not-taken prediction bit into the GSR for a branch instruction in response to determining the branch instruction corresponds to an indirect, unconditional branch instruction with two targets.

15. The microprocessor as recited in claim 11, wherein in response to determining the branch instruction corresponds to an indirect, unconditional branch instruction with two targets, the control flow prediction unit is configured to shift a taken/not-taken prediction bit into the GSR for the branch instruction.

* * * * *